United States Patent
Sugiyama

(10) Patent No.: US 10,450,000 B2
(45) Date of Patent: Oct. 22, 2019

(54) ELECTRIC POWER STEERING SYSTEM

(71) Applicant: JTEKT CORPORATION, Osaka-shi, Osaka (JP)

(72) Inventor: Toyoki Sugiyama, Nara (JP)

(73) Assignee: JTEKT CORPORATION, Osaka-shi (JP)

( * ) Notice: Subject to any disclaimer, the term of this patent is extended or adjusted under 35 U.S.C. 154(b) by 147 days.

(21) Appl. No.: 15/493,691

(22) Filed: Apr. 21, 2017

(65) Prior Publication Data

US 2017/0313349 A1 Nov. 2, 2017

(30) Foreign Application Priority Data

Apr. 28, 2016 (JP) ................. 2016-091636

(51) Int. Cl.
*B62D 6/02* (2006.01)
*H02J 7/00* (2006.01)
*B62D 5/04* (2006.01)
*H02P 27/06* (2006.01)
*B60R 16/033* (2006.01)

(52) U.S. Cl.
CPC .............. *B62D 6/02* (2013.01); *B60R 16/033* (2013.01); *B62D 5/046* (2013.01); *B62D 5/0457* (2013.01); *H02J 7/0068* (2013.01); *H02P 27/06* (2013.01)

(58) Field of Classification Search
CPC ........ B62D 6/02; B62D 5/046; B62D 5/0457; H02P 27/06; B60R 16/033; H02J 7/0068
See application file for complete search history.

(56) References Cited

U.S. PATENT DOCUMENTS

2014/0222294 A1* 8/2014 Sugiyama .............. B62D 5/046
701/42

FOREIGN PATENT DOCUMENTS

| EP | 2762386 A2 | 8/2014 |
| JP | 2009-078737 A | 4/2009 |
| WO | 2009/138831 A1 | 11/2009 |

OTHER PUBLICATIONS

Sep. 28, 2017 Search Report issued in European Patent Application No. 17168036.6.

* cited by examiner

*Primary Examiner* — Rexford N Barnie
*Assistant Examiner* — Thai H Tran
(74) *Attorney, Agent, or Firm* — Oliff PLC

(57) ABSTRACT

An electric power steering system includes a vehicle speed sensor configured to detect a vehicle speed, a motor driving circuit configured to supply power to an electric motor, a main power supply and a capacitor that can supply power to a driving circuit, a charging circuit configured to charge the capacitor based on the main power supply, and an ECU for power source control that controls the charging circuit. The ECU for power source control drives the charging circuit to charge the capacitor only when the vehicle speed is lower than a first predetermined value and an inter-terminal voltage of the capacitor is lower than a second predetermined value.

2 Claims, 6 Drawing Sheets

ELECTRIC POWER STEERING SYSTEM

INCORPORATION BY REFERENCE

The disclosure of Japanese Patent Application No. 2016-091636 filed on Apr. 28, 2016 including the specification, drawings and abstract, is incorporated herein by reference in its entirety.

BACKGROUND OF THE INVENTION

1. Field of the Invention

The invention relates to an electric power steering system that generates a steering assist force using an electric motor.

2. Description of the Related Art

Japanese Patent Application Publication No. 2009-78737 (JP 2009-78737 A) discloses an electric power steering system including a main power supply and an auxiliary power supply. In the electric power steering system described in JP 2009-78737 A, when a vehicle speed is equal to or higher than a predetermined value and a steering speed is equal to or lower than a predetermined value, a motor driving circuit is supplied with power only by main power supply. Furthermore, in the electric power steering system described in JP 2009-78737 A, when the vehicle speed is equal to or higher than the predetermined value and the steering speed is equal to or lower than the predetermined value, if the voltage of the auxiliary power supply has not reached a given value, a charging circuit is driven to charge the auxiliary power supply. On the other hand, when the vehicle speed is lower than the predetermined value or the steering speed is higher than the predetermined value, the motor driving circuit is supplied with power by the main power supply and the auxiliary power supply.

SUMMARY OF THE INVENTION

An object of the invention is to provide an electric power steering system that allows a driving circuit to be supplied with power by a main power supply and an auxiliary power supply in a situation where at least stationary steering is enabled, while allowing the auxiliary power supply to be charged only in the situation where stationary steering is enabled.

An electric power steering system in an aspect of the invention has a vehicle speed detector configured to detect a vehicle speed, a driving circuit configured to supply power to an electric motor, a main power supply enabled to supply power to the driving circuit, an auxiliary power supply enabled to supply power to the driving circuit, a charging circuit configured to charge the auxiliary power supply based on the main power supply, a switching circuit configured to switch a power supply state between a first power supply state where the driving circuit is supplied with power only by the main power supply and a second power supply state where the driving circuit is supplied with power utilizing both the main power supply and the auxiliary power supply, a first controller that controls the charging circuit, and a second controller that controls the switching circuit. The first controller is configured to drive the charging circuit to charge the auxiliary power supply only when the vehicle speed detected by the vehicle speed detector is lower than a predetermined first threshold and an inter-terminal voltage of the auxiliary power supply is lower than a predetermined second threshold.

In this configuration, the auxiliary power supply is enabled to be charged only in a situation where stationary steering is enabled. Thus, compared to a case where the auxiliary power supply can be constantly charged (a case where the auxiliary power supply is charged each time the inter-terminal voltage of the auxiliary power supply becomes lower than the predetermined value), the present configuration enables a reduction in the frequency of charging of the auxiliary power supply, allowing the life of the auxiliary power supply to be extended.

In the electric power steering system in the above-described aspect, the second controller may be configured to set the switching circuit such that the power supply state is switched to the second power supply state at least when the vehicle speed detected by the vehicle speed detector is lower than a predetermined third threshold.

In this configuration, the switching circuit is set such that the power supply state is switched to the second power supply state when the vehicle speed detected by the vehicle speed detector is lower than the predetermined third threshold. Consequently, the driving circuit can be supplied with power by the main power supply and the auxiliary power supply in the situation where stationary steering, which needs a high steering assist force, is enabled (the situation where the vehicle speed is low).

In the electric power steering system in the above-described aspect, the second controller may be configured to set the switching circuit, when the power supply state is the first power supply state and the vehicle speed detected by the vehicle speed detector is lower than the predetermined third threshold, such that the power supply state is switched to the second power supply state, and to set the switching circuit, when the power supply state is the second power supply state and the vehicle speed detected by the vehicle speed detector is equal to or higher than the third threshold, such that the power supply state is switched to the first power supply state.

In this configuration, the power supply state is switched to the second power supply state if the the vehicle speed detected by the vehicle speed detector is lower than the third threshold and to switch. Consequently, the driving circuit can be supplied with power by the main power supply and the auxiliary power supply in the situation where stationary steering, which needs a high steering assist force, is enabled (the situation where the vehicle speed is low).

In the electric power steering system in the above-described aspect, the auxiliary power supply may be a capacitor, and the second controller may be configured to set the switching circuit, when the power supply state is the first power supply state and the vehicle speed detected by the vehicle speed detector is lower than the predetermined third threshold, such that the power supply state is switched to the second power supply state and to set the switching circuit, when the power supply state is the second power supply state and the vehicle speed detected by the vehicle speed detector is equal to or higher than the third threshold, such that the power supply state is switched to the first power supply state after the second power supply state is maintained until the inter-terminal voltage of the auxiliary power supply becomes equal to or lower than a predetermined fourth threshold.

In this configuration, the second power supply state is maintained until the inter-terminal voltage of the auxiliary power supply becomes equal to or lower than the predetermined fourth threshold if the vehicle speed is equal to or higher than the third threshold. Thus, the amount of charge can be reduced which is accumulated in the auxiliary power supply when the vehicle speed is equal to or higher than the third threshold. Consequently, the life of the auxiliary power supply can be extended.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below in detail with reference to the attached drawings.

Figure 1:
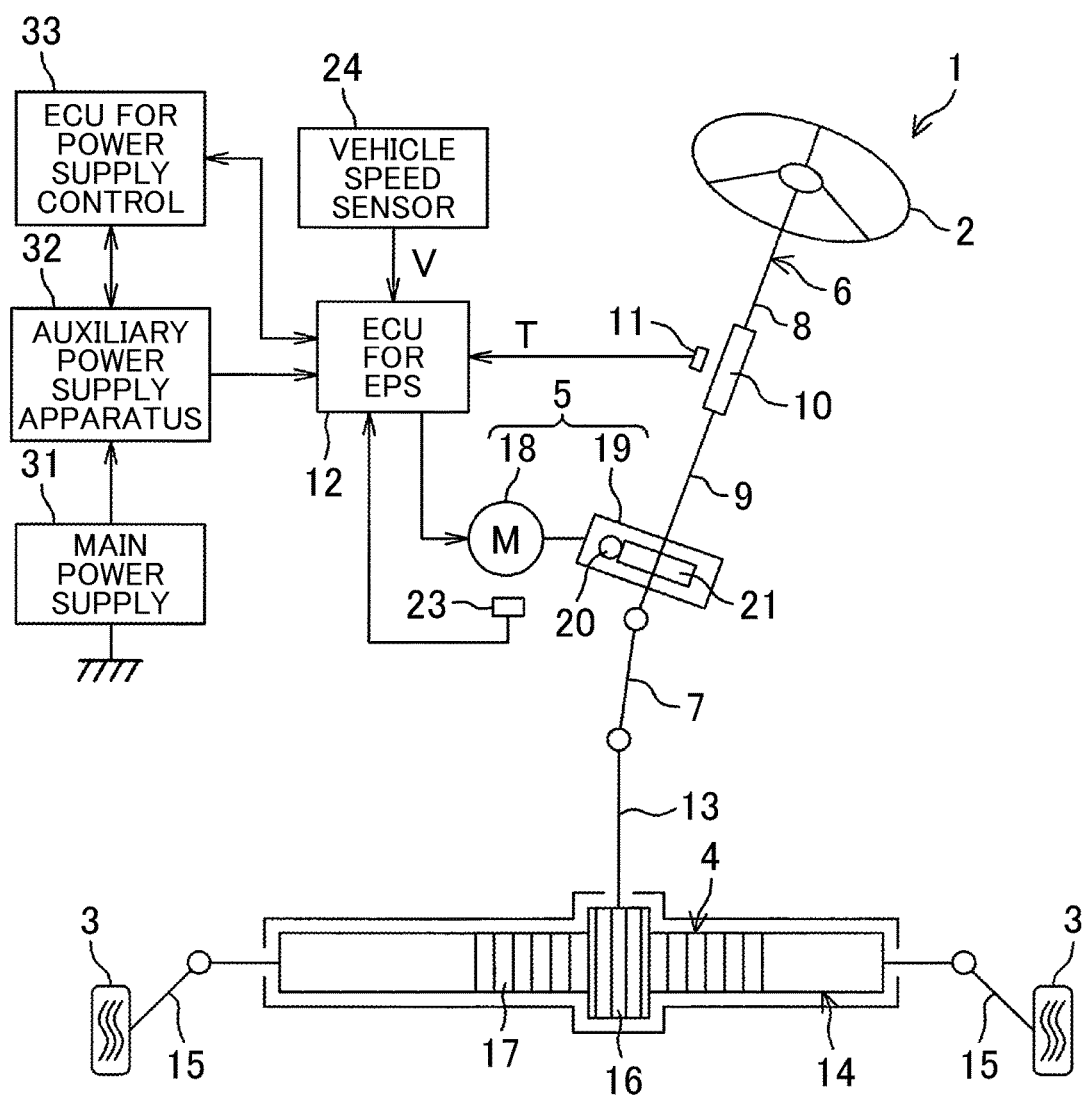
FIG. 1 is a schematic diagram depicting a general configuration of an electric power steering system according to an embodiment of the invention.

FIG. 1 is a schematic diagram depicting a general configuration of an electric power steering system according to an embodiment of the invention.

An electric power steering system (EPS) 1 includes a steering wheel 2 serving as a steering member configured to steer a vehicle, a steering operation mechanism 4 that steers steered wheels 3 in conjunction with rotation of the steering wheel 2, and a steering assist mechanism 5 configured to assist a driver's steering. The steering wheel 2 and steering operation mechanism 4 are mechanically coupled together via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are coupled together so as to be rotatable relative to each other via a torsion bar 10.

A torque sensor 11 is arranged near the torsion bar 10. The torque sensor 11 detects a steering torque T applied to the steering wheel 2 based on relative rotational displacement between the input shaft 8 and the output shaft 9. In the present embodiment, in regard to the steering torque T detected by the torque sensor 11, for example, a torque applied for rightward steering is detected as a positive value, and a torque applied for leftward steering is detected as a negative value. The magnitude of the steering torque T increases consistently with the absolute value of the steering torque T.

The steering operation mechanism 4 is a rack-and-pinion mechanism including a pinion shaft 13 and a rack shaft 14 serving as a steered shaft. Each of the steered wheels 3 is coupled to a corresponding one of opposite ends of the rack shaft 14 via a tie rod 15 and a knuckle arm (not depicted in the drawings). The pinion shaft 13 is coupled to the intermediate shaft 7. The pinion shaft 13 rotates in conjunction with steering of the steering wheel 2. A pinion 16 is coupled to a tip (in FIG. 1, a lower end) of the pinion shaft 13.

The rack shaft 14 extends linearly along a lateral direction of an automobile. A rack 17 is formed in an axially intermediate portion of the rack shaft 14 so as to mesh with the pinion 16. The pinion 16 and the rack 17 convert rotation of the pinion shaft 13 into axial movement of the rack shaft 14. Axial movement of the rack shaft 14 allows the steered wheels 3 to be steered.

When the steering wheel 2 is steered (rotated), the resultant rotation is transmitted to the pinion shaft 13 via the steering shaft 6 and the intermediate shaft 7. Rotation of the pinion shaft 13 is converted into axial movement of the rack shaft 14 by the pinion 16 and the rack 17. Consequently, the steered wheels 3 are steered.

A steering assist mechanism 5 includes an electric motor 18 for steering assistance, and a reduction mechanism 19 configured to transmit an output torque from the electric motor 18 to the steering operation mechanism 4. The electric motor 18 is, for example, a three-phase brushless motor. The electric motor 18 is provided with a rotation angle sensor 23 such as a resolver which is configured to detect a rotation angle of the electric motor 18.

The reduction mechanism 19 is a worm gear mechanism including a worm shaft 20 and a worm wheel 21 that meshes with the worm shaft 20. The worm shaft 20 is rotationally driven by the electric motor 18. The worm wheel 21 is integrally rotatably coupled to the steering shaft 6. The worm wheel 21 is rotationally driven by the worm shaft 20.

When the worm shaft 20 is rotationally driven by the electric motor 18, the worm wheel 21 is rotationally driven to rotate the steering shaft 6. Rotation of the steering shaft 6 is transmitted to the pinion shaft 13 via the intermediate shaft 7. Rotation of the pinion shaft 13 is converted into axial movement of the rack shaft 14. Consequently, the steered wheels 3 are steered. That is, the worm shaft 20 is rotationally driven by the electric motor 18 to steer the steered wheels 3.

The vehicle is provided with a vehicle speed sensor 24 configured to detect a vehicle speed V. An electronic control unit (ECU) 12 for the EPS receives inputs of the steering torque T detected by the torque sensor 11, the rotation angle of the electric motor 18 detected by the rotation angle sensor 23, the vehicle speed V detected by the vehicle speed sensor 24, and the like. Based on these inputs and the like, the ECU 12 for the EPS controls the electric motor 18 to perform what is called assist control.

An auxiliary power supply apparatus 32 is controlled by an ECU 33 for power supply control. The ECU 12 for the EPS and the ECU 33 for power supply control are connected together via a communication line.

Figure 2:
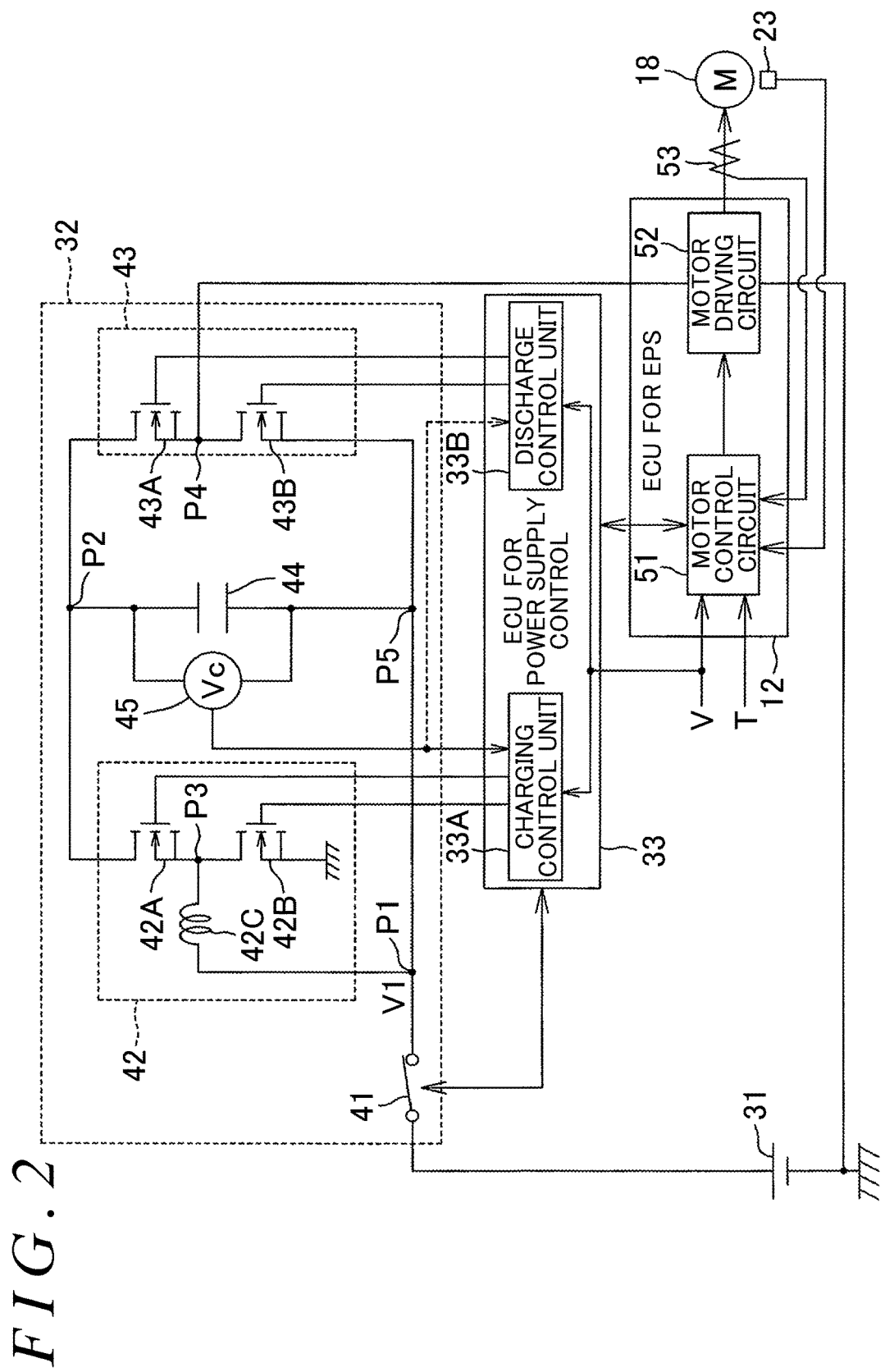
FIG. 2 is a circuit diagram illustrating an example of an electric configuration of the electric power steering system in FIG. 1.

FIG. 2 is a circuit diagram illustrating an example of an electric configuration of the electric power steering system 1.

The ECU 12 for the EPS includes a motor control circuit 51 that is a microcomputer, and a motor driving circuit (inverter circuit) 52 controlled by the motor control circuit 51 to supply power to the electric motor 18. The ECU 12 for the EPS receives an output signal from a current sensor 53 configured to detect a motor current flowing through the electric motor 18.

The motor control circuit 51 controllably drives the motor driving circuit 52 based on the steering torque T detected by the torque sensor 11, the vehicle speed V detected by the vehicle speed sensor 24, the rotation angle detected by the rotation angle sensor 23, and the motor current detected by the current sensor 53. Specifically, the motor control circuit 51 sets a target current value based on the steering torque T and the vehicle speed V, and controllably drives the motor driving circuit 52 so as to make the motor current flowing through the electric motor 18 equal to the target current value.

The auxiliary power supply apparatus 32 is connected in series with a main power supply 31. The auxiliary power supply apparatus 32 includes a relay 41, a charging circuit 42, a discharge circuit (switching circuit) 43, and a capacitor 44 serving as an auxiliary power supply.

The relay 41 is arranged between a positive electrode terminal of the main power supply 31 and the charging circuit 42. A junction between the relay 41 and the charging circuit 42 is denoted as P1. The charging circuit 42 is a circuit that charges the capacitor 44. The charging circuit 42 includes a pair of switching elements 42A, 42B connected together in series, and a booster coil 42C connected between the junction P1 and a junction P3 between the switching elements 42A, 42B. The switching elements 42A, 42B are n-channel MOSFETs.

A source of the upper-stage switching element 42A is connected to a drain of the lower-stage switching element 42B. A drain of the upper-stage switching element 42A is connected to an output terminal (junction P2) of the capacitor 44. A source of the lower-stage switching element 42B is grounded. The junction P1 is connected to an input terminal (junction P5) of the capacitor 44. The switching elements 42A, 42B are alternately turned on to allow an output voltage (battery voltage VB) of the junction P1 to be raised so that the raised voltage can be applied to the output terminal of the capacitor 44. Consequently, the capacitor 44 can be charged.

The discharge circuit 43 is connected in series with the charging circuit 42. The discharge circuit 43 includes a pair of switching elements 43A, 43B that are connected together in series. The switching elements 43A, 43B are n-channel MOSFETs. A source of the upper-stage switching element 43A is connected to a drain of the lower-stage switching element 43B. A drain of the upper-stage switching element 43A is connected to the output terminal (junction P2) of the capacitor 44. A source of the lower-stage switching element 43B is connected to the input terminal (junction P5) of the capacitor 44. A junction P4 between the switching elements 43A, 43B is connected to the motor driving circuit 52 in the ECU 12 for the EPS.

When the lower-stage switching element 43B is on and the upper-stage switching element 43A is off, the motor driving circuit 52 is supplied with power only by the main power supply 31. A state where the motor driving circuit 52 is supplied with power only by the main power supply 31 may be referred to as a first power supply state.

On the other hand, when the lower-stage switching element 43B is off and the upper-stage switching element 43A is on, the capacitor 44 can discharge power to the motor driving circuit 52. Consequently, the motor driving circuit 52 is supplied with power both by the main power supply 31 and by the capacitor 44. When the lower-stage switching element 43B and the upper-stage switching element 43A are alternately turned on, the voltage applied to the motor driving circuit 52 can be varied according to the ratio between on times of the switching elements. A state where the motor driving circuit 52 is supplied with power both by the main power supply 31 and by the capacitor 44 is referred to as a second power supply state; in the second power supply state, the lower-stage switching element 43B is turned off and the upper-stage switching element 43A is turned on, or the lower-stage switching element 43B and the upper-stage switching element 43A are alternately turned on, as described above.

A voltage sensor 45 detects an inter-terminal voltage (capacitor voltage) Vc of the capacitor 44. A detected value from the voltage sensor 45 is input to the ECU 33 for power supply control. The vehicle speed V detected by the vehicle speed sensor 24 is input to the ECU 33 for power supply control. An ignition state sensing signal (not depicted in the drawings) indicative of the state of an ignition key is input to the ECU 33 for power supply control.

The ECU 33 for power supply control is a microcomputer. The microcomputer includes a CPU and a memory (memory such as a ROM, a RAM, or a nonvolatile memory) that stores a program for the CPU.

The ECU 33 for power supply control controllably turns on and off the relay 41 based on the ignition state sensing signal. When the ignition key is turned on, the corresponding ignition state sensing signal (hereinafter referred to as the ignition on state signal) is input to the ECU 33 for power supply control. Upon receiving the ignition on state signal, the ECU 33 for power supply control turns on the relay 41. When the ignition key is turned off, the corresponding ignition state sensing signal (hereinafter referred to as the ignition off state signal) is input to the ECU 33 for power supply control. Upon receiving the ignition off state signal, the ECU 33 for power supply control turns off the relay 41.

The ECU 33 for power supply control includes, as a function processing unit, a charging control unit 33A configured to control the charging circuit 42 and a discharge control unit 33B configured to control the discharge circuit 43. The charging control unit 33A controls the switching elements 42A, 42B in the charging circuit 42 based on the capacitor voltage Vc detected by the voltage sensor 45 and the vehicle speed V detected by the vehicle speed sensor 24. The switching elements 42A, 42B are constantly off.

The discharge control unit 33B switches the power supply state between the first power supply state and the second power supply state based on the vehicle speed V detected by the vehicle speed sensor 24. When the power supply state is set to the first power supply state, the discharge control unit 33B sets the lower-stage switching element 43B in the discharge circuit (switching circuit) 43 to be turned on, while setting the upper-stage switching element 43A in the discharge circuit 43 to be turned off.

When the power supply state is set to the second power supply state, the discharge control unit 33B sets the upper-stage switching element 43A in the discharge circuit (switching circuit) 43 to be turned on, while setting the lower-stage switching element 43B in the discharge circuit 43 to be turned off. Consequently, the motor driving circuit 52 is supplied with power both by the main power supply 31 and by the capacitor 44. In this case, the discharge control unit 33B may alternately turn on the switching elements 43A, 43B in the discharge circuit 43.

Figure 3:
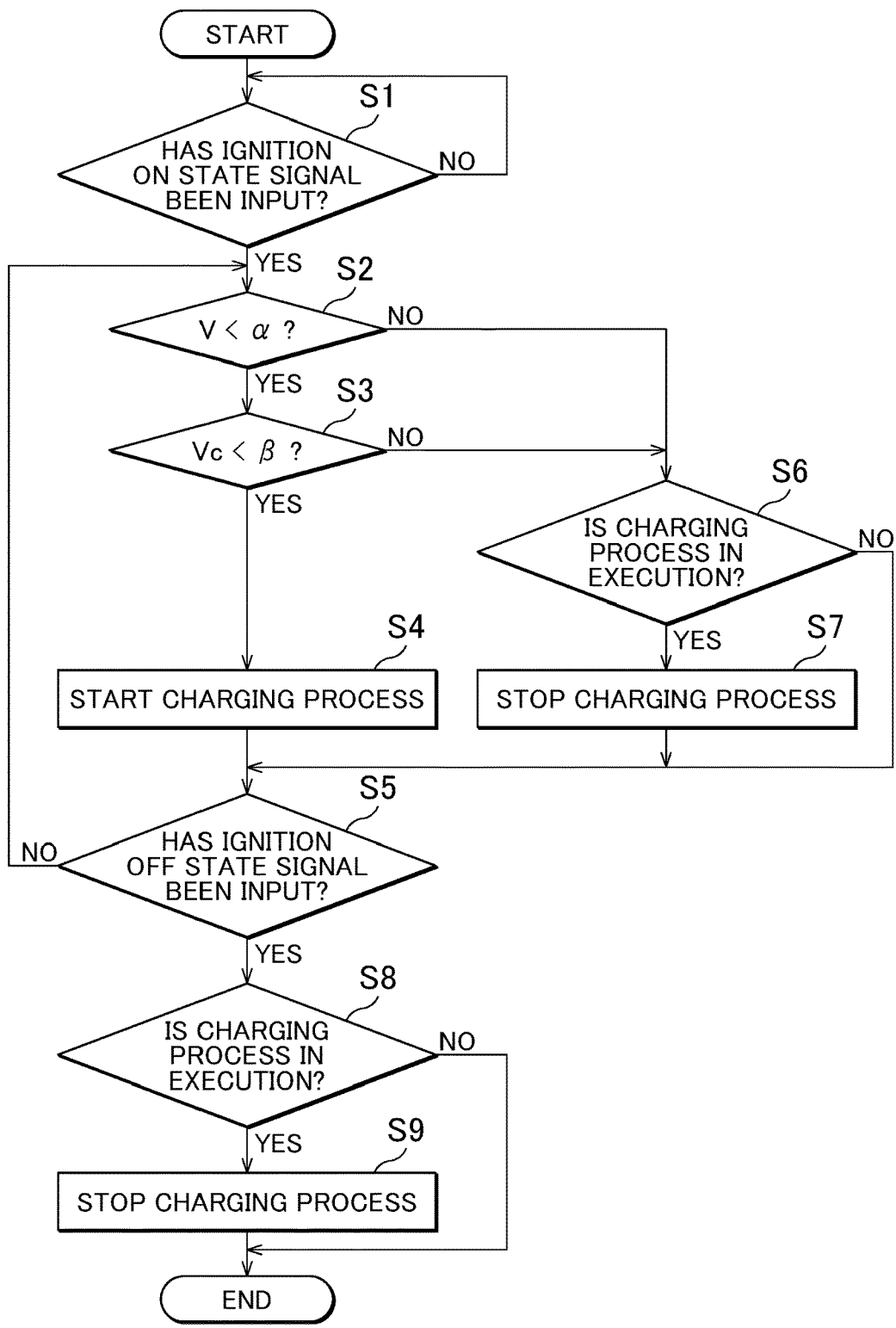
FIG. 3 is a flowchart illustrating a procedure of a charging control process executed by a charging control unit.

FIG. 3 is a flowchart illustrating a procedure of a charging control process executed by the charging control unit 33A.

When the ignition on state signal is input to the ECU 33 for power supply control (step S1), the charging control unit 33A determines whether or not the vehicle speed V detected by the vehicle speed sensor 24 is lower than a predetermined first threshold $\alpha$ ($\alpha > 0$) (step S2). If the vehicle speed V is lower than the first threshold $\alpha$ (step S2: YES), the charging control unit 33A determines whether or not the capacitor voltage Vc is lower than a predetermined second threshold $\beta$ ($\beta > 0$) (step S3).

If the capacitor voltage Vc is lower than the second threshold β (step S3: YES), the charging control unit 33A starts a charging process (step S4). Specifically, the charging control unit 33A alternately turns on the switching elements 42A, 42B in the charging circuit 42. Consequently, the capacitor 44 is charged. When step S3 shifts to step S4, if the charging process has already been started, the charging control unit 33A continues the charging process.

Subsequently, the charging control unit 33A shifts to step S5 to determine whether or not the ignition off state signal has been input. If the ignition off state signal has not been input (step S5: NO), the charging control unit 33A returns to step S2.

Upon determining, in step S2, that the vehicle speed V is equal to or higher than the first threshold α (step S2: NO), or in step S3, that the capacitor voltage Vc is equal to or higher than the second threshold β (step S3: NO), the charging control unit 33A shifts to step S6. In step S6, the charging control unit 33A determines whether or not the charging process is in execution.

If the charging process is in execution (step S6: YES), the charging control unit 33A stops the charging process (step S7). Specifically, the charging control unit 33A turns off the switching elements 42A, 42B in the charging circuit 42. Subsequently, the charging control unit 33A shifts to step S5 to determine whether or not the ignition off state signal has been input. If the ignition off state signal has not been input (step S5: NO), the charging control unit 33A returns to step S2.

In step S6, if the charging process is not in execution (step S6: NO), the charging control unit 33A shifts to step S5 to determine whether or not the ignition off state signal has been input. If the ignition off state signal has not been input (step S5: NO), the charging control unit 33A returns to step S2.

In step S5, upon determining that the ignition off state signal has been input (step S5: YES), the charging control unit 33A determines whether or not the charging process is in execution (step S8). If the charging process is in execution (step S8: YES), the charging control unit 33A stops the charging process (step S9) and then ends the charging control process. In step S8, upon determining that the charging process is not in execution (step S8: NO), the charging control unit 33A ends the charging control process.

Figure 4:
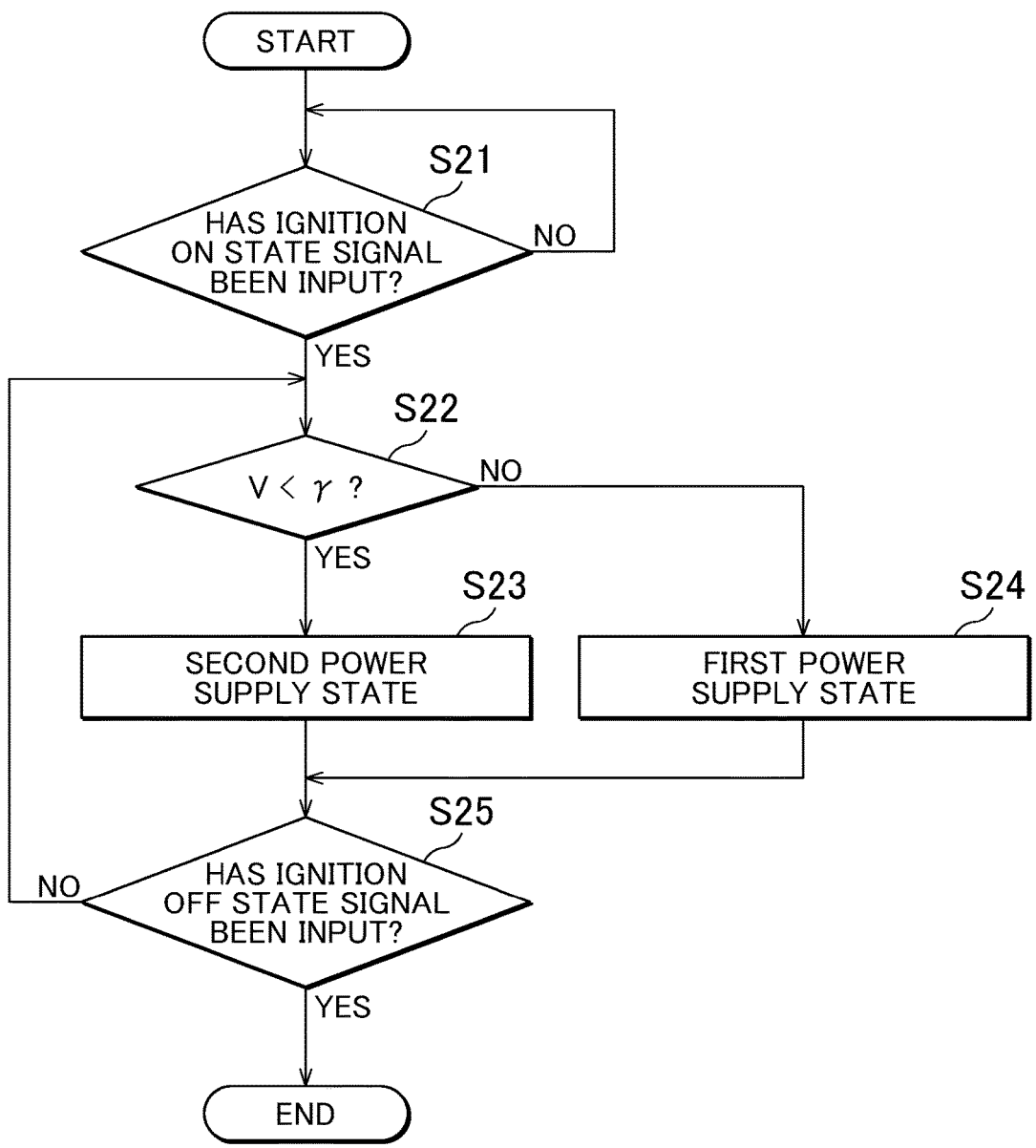
FIG. 4 is a flowchart illustrating a procedure of a power supply state switching process executed by a discharge control unit.

FIG. 4 is a flowchart illustrating a procedure of a power supply state switching process executed by the discharge control unit 33B.

When the ignition on state signal is input to the ECU 33 for power supply control (step S21), the discharge control unit 33B determines whether or not the vehicle speed V detected by the vehicle speed sensor 24 is lower than a predetermined third threshold γ (γ>0) (step S22). The third threshold γ may be the same as or different from the first threshold α. If the vehicle speed V is lower than the third threshold γ (step S22: YES), the discharge control unit 33B sets the power supply state to the second power supply state (step S23). Consequently, the motor driving circuit 52 is supplied with power both by the main power supply 31 and by the capacitor 44. If the discharge circuit 43 is set such that the power supply state is the second power supply state immediately before step S22, the second power supply state is maintained. If the discharge circuit 43 is set such that the power supply state is the first power supply state immediately before step S22, the discharge circuit 43 is set such that the power supply state is switched to the second power supply state.

Subsequently, the discharge control unit 33B shifts to step S25 to determine whether or not the ignition off state signal has been input. If the ignition off state signal has not been input (step S25: NO), the discharge control unit 33B returns to step S22.

In step S22, upon determining that the vehicle speed V is equal to or higher than the third threshold γ (step S22: NO), the discharge control unit 33B sets the power supply state to the first power supply state (step S24). Consequently, the motor driving circuit 52 is supplied with power only by the main power supply 31. If the discharge circuit 43 is set such that the power supply state is the first power supply state immediately before step S22, the first power supply state is maintained. If the discharge circuit 43 is set such that the power supply state is the second power supply state immediately before step S22, the discharge circuit 43 is set such that the power supply state is switched to the first power supply state.

Subsequently, the discharge control unit 33B shifts to step S25 to determine whether or not the ignition off state signal has been input. If the ignition off state signal has not been input (step S25: NO), the discharge control unit 33B returns to step S22.

In step S25, upon determining that the ignition off state signal has been input (step S25: YES), the discharge control unit 33B ends the power supply state switching process.

In the present embodiment, the capacitor 44 can be charged exclusively in a situation where stationary steering is enabled. Thus, compared to a case where the capacitor 44 can constantly be charged (a case where charging is performed each time the capacitor voltage Vc becomes lower than a predetermined value), the present configuration enables a reduction in the frequency of charging of the capacitor 44. Consequently, the life of the capacitor (auxiliary power supply) 44 can be extended.

In the present embodiment, the discharge circuit (switching circuit) 43 is set such that the power supply state is switched to the second power supply state when the vehicle speed V detected by the vehicle speed sensor 24 is lower than the third threshold γ. Consequently, in the situation where stationary steering, which needs a high steering assist force, is enabled (the situation where the vehicle speed V is low), the motor driving circuit 52 can be supplied with power by the main power supply 31 and the capacitor (auxiliary power supply) 44.

In FIG. 4, the power supply state is set to the first power supply state when the vehicle speed V is equal to or higher than the third threshold γ. However, even if the vehicle speed V is equal to or higher than the third threshold γ, the power supply state may be set to the second power supply state when a predetermined condition is met (for example, when a steering speed exceeds a predetermined speed, when the steering torque T exceeds a predetermined value, or when the amount of power needed for the electric motor 18 exceeds a predetermined value).

Figure 5:
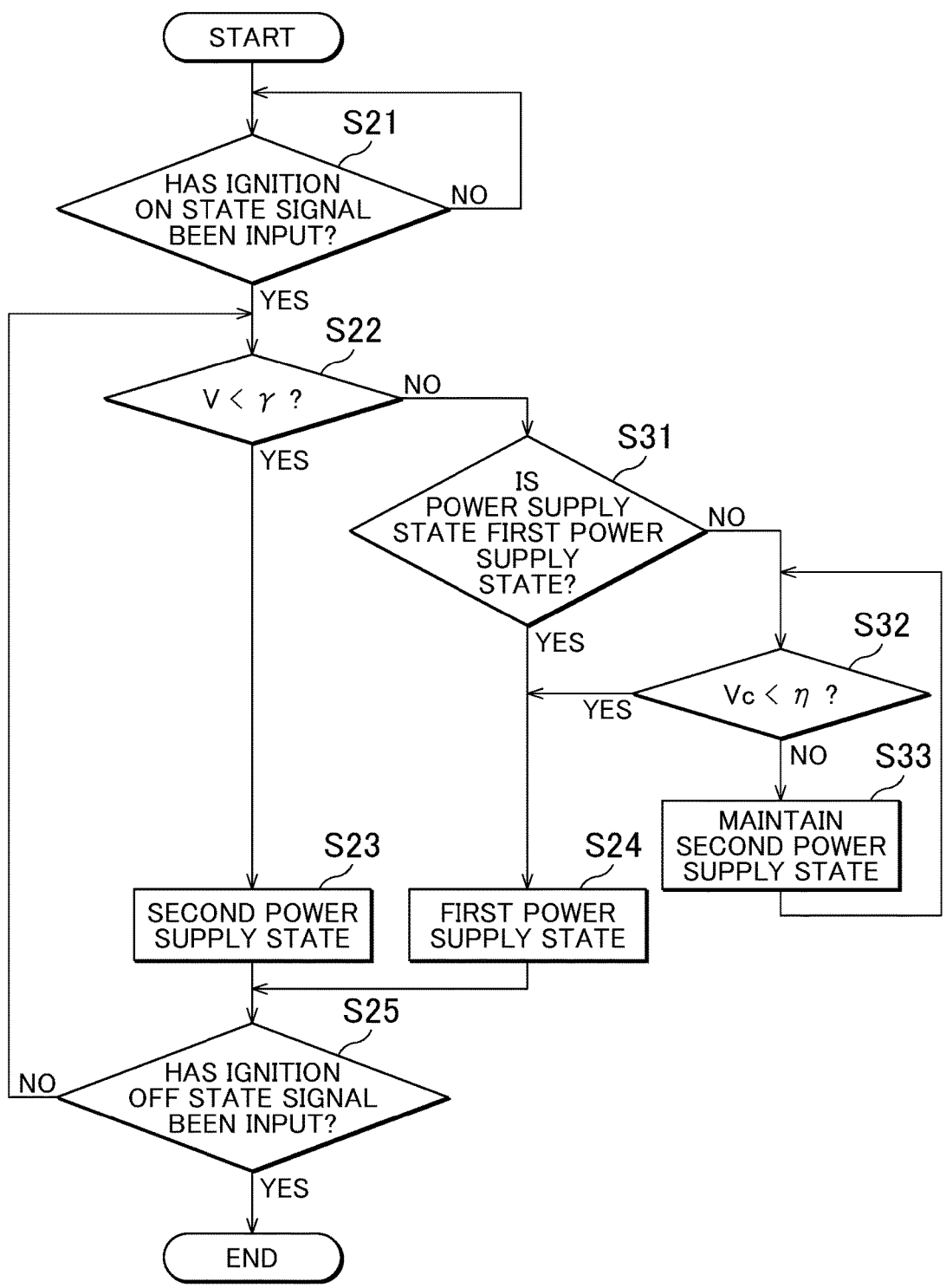
FIG. 5 is a flowchart illustrating another example of the power supply state switching process executed by the discharge control unit.

FIG. 5 is a flowchart illustrating another example of the power supply state switching process executed by the discharge control unit 33B.

When the discharge control unit 33B executes the power supply state switching process in FIG. 5, the detected value from the voltage sensor 45 is also input to the discharge control unit 33B as depicted by a dashed line in FIG. 2.

Steps in FIG. 5 corresponding to steps in FIG. 4 described above are denoted by the same step number as those in FIG. 4.

In the process in FIG. 5, upon determining, in step S22, that the vehicle speed V is equal to or higher than the third threshold γ (step S22: NO), the discharge control unit 33B determines whether or not the power supply state is in the first power supply state (step S31). Upon determining the power supply state to be the first power supply state (step S31: YES), the discharge control unit 33B sets the power supply state to the first power supply state (step S24). Consequently, the first power supply state is maintained.

In step 31, on the other hand, if the power supply state is determined to be the second power supply state (step S31: NO), that is, if the vehicle speed V changes from a value smaller than the third threshold γ to a value equal to or larger than the third threshold γ, the discharge control unit 33B determines whether or not the capacitor voltage Vc is lower than a fourth threshold η (η>0) (step S32). The fourth threshold η is set to be, for example, a value larger than zero and smaller than the second threshold β and close to zero.

Upon determining that the capacitor voltage Vc is lower than the fourth threshold η (step S32: YES), the discharge control unit 33B sets the power supply state to the first power supply state (step S24). Consequently, the discharge circuit 43 is switched to the first power supply state.

In step S32, upon determining that the capacitor voltage Vc is equal to or higher than the fourth threshold η (step S32: NO), the discharge control unit 33B maintains the second power supply state until the capacitor voltage Vc becomes lower than the fourth threshold η (steps S33, S32). When the capacitor voltage Vc is lower than the fourth threshold η (step S32: YES), the discharge control unit 33B sets the power supply state to the first power supply state (step S24). Consequently, the discharge circuit 43 is set such that the power supply state is switched to the first power supply state.

In the present embodiment, when the vehicle speed V changes from a value smaller than the third threshold γ to a value equal to or larger than the third threshold γ, if the capacitor voltage Vc is equal to or higher than the fourth threshold η, the capacitor 44 is discharged until the capacitor voltage Vc becomes lower than the fourth threshold η. This enables a reduction in the amount of charge stored in the capacitor 44 when the vehicle speed V is equal to or higher than the third threshold γ. Consequently, the life of the capacitor (auxiliary power supply) 44 can be further extended.

In FIG. 5, the power supply state is in principle set to the first power supply state when the vehicle speed V is equal to or higher than the third threshold γ. However, even if the vehicle speed V is equal to or higher than the third threshold γ, the power supply state may be set to the second power supply state when the predetermined condition is met (for example, when the steering speed exceeds the predetermined speed, when the steering torque T exceeds the predetermined value, or when the amount of power needed for the electric motor 18 exceeds the predetermined value).

Figure 6:
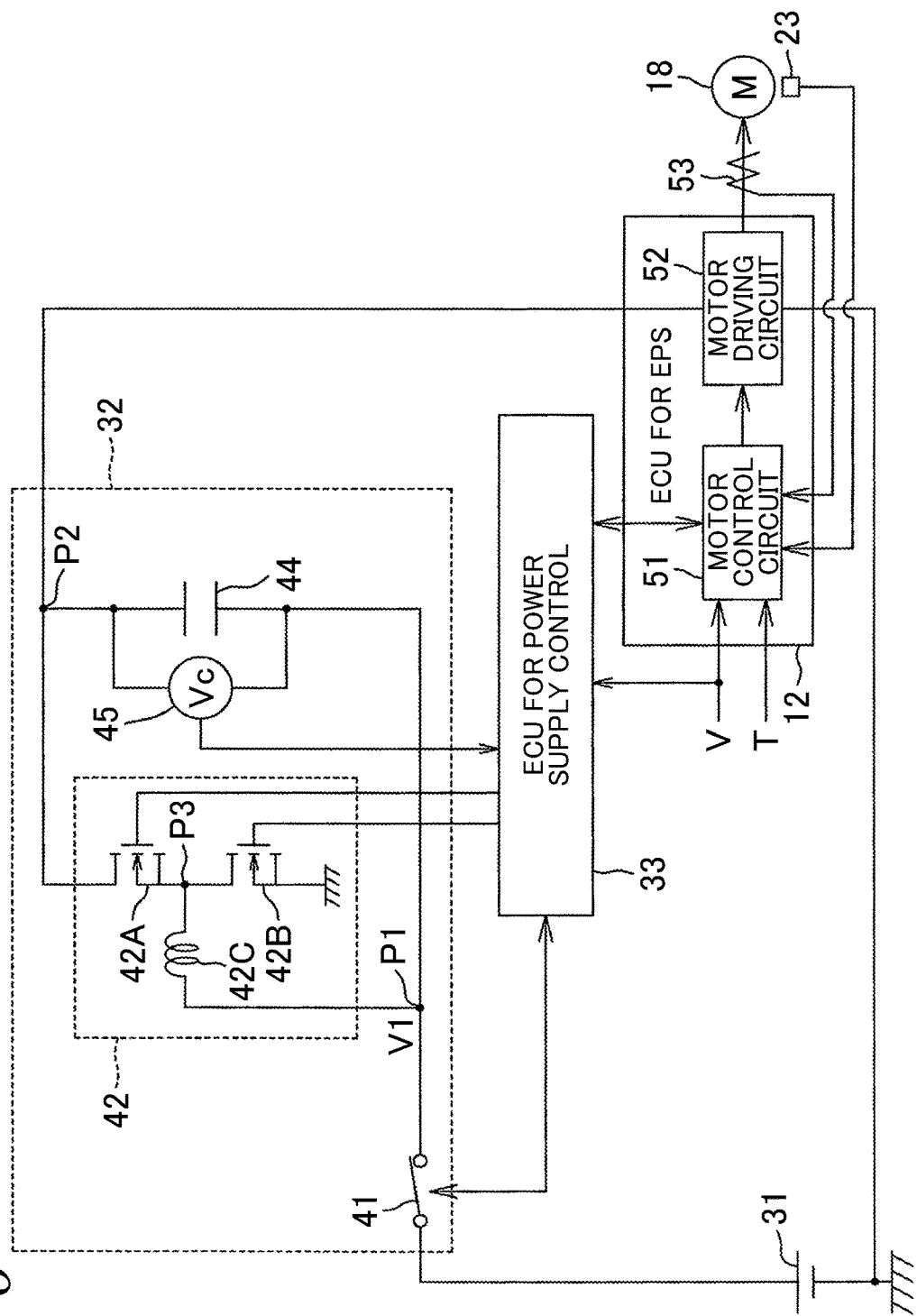
FIG. 6 is a circuit diagram illustrating another example of an electric configuration of the electric power steering system in FIG. 1.

FIG. 6 is a circuit diagram illustrating another example of the electric configuration of the electric power steering system 1.

The ECU 12 for the EPS includes the motor control circuit 51 that is a microcomputer, and the motor driving circuit (inverter circuit) 52 controlled by the motor control circuit 51 to supply power to the electric motor 18. The ECU 12 for the EPS receives an output signal from the current sensor 53 configured to detect the motor current flowing through the electric motor 18.

The motor control circuit 51 controllably drives the motor driving circuit 52 based on the steering torque T detected by the torque sensor 11, the vehicle speed V detected by the vehicle speed sensor 24, the rotation angle detected by the rotation angle sensor 23, and the motor current detected by the current sensor 53. Specifically, the motor control circuit 51 sets the target current value based on the steering torque T and the vehicle speed V, and controllably drives the motor driving circuit 52 so as to make the motor current flowing through the electric motor 18 equal to the target current value.

The auxiliary power supply apparatus 32 is connected in series with the main power supply 31. The auxiliary power supply apparatus 32 includes the relay 41, the charging circuit 42, and the capacitor 44 serving as an auxiliary power supply.

The relay 41 is arranged between the positive electrode terminal of the main power supply 31 and the charging circuit 42. A junction between the relay 41 and the charging circuit 42 is denoted as P1. The charging circuit 42 is a circuit that charges the capacitor 44. The charging circuit 42 includes the pair of switching elements 42A, 42B connected together in series, and the booster coil 42C connected between the junction P1 and the junction P3 between the switching elements 42A, 42B. The switching elements 42A, 42B are n-channel MOSFETs.

The source of the upper-stage switching element 42A is connected to the drain of the lower-stage switching element 42B. The drain of the upper-stage switching element 42A is connected to the output terminal (junction P2) of the capacitor 44. The source of the lower-stage switching element 42B is grounded. The junction P1 is connected to the input terminal of the capacitor 44. The switching elements 42A, 42B are alternately turned on to allow the output voltage (battery voltage VB) of the junction P1 to be raised so that the raised voltage can be applied to the output terminal of the capacitor 44. Consequently, the capacitor 44 can be charged.

The output terminal (junction P2) of the capacitor 44 is connected to the motor driving circuit 52 in the ECU 12 for the EPS. Therefore, the motor driving circuit 52 is constantly supplied with power both by the main power supply 31 and by the capacitor 44.

The voltage sensor 45 detects the inter-terminal voltage (capacitor voltage) Vc of the capacitor 44. The detected value from the voltage sensor 45 is input to the ECU 33 for power supply control. The vehicle speed V detected by the vehicle speed sensor 24 is input to the ECU 33 for power supply control. The ignition state sensing signal (not depicted in the drawings) indicative of the state of the ignition key is input to the ECU 33 for power supply control.

The ECU 33 for power supply control is a microcomputer. The microcomputer includes a CPU and a memory (memory such as a ROM, a RAM, or a nonvolatile memory) that stores a program for the CPU.

The ECU 33 for power supply control controllably turns on and off the relay 41 based on the ignition state sensing signal. When the ignition key is turned on, the corresponding ignition state sensing signal (hereinafter referred to as the ignition on state signal) is input to the ECU 33 for power supply control. Upon receiving the ignition on state signal, the ECU 33 for power supply control turns on the relay 41. When the ignition key is turned off, the corresponding ignition state sensing signal (hereinafter referred to as the ignition off state signal) is input to the ECU 33 for power supply control. Upon receiving the ignition off state signal, the ECU 33 for power supply control turns off the relay 41.

The ECU 33 for power source control controls the switching elements 42A, 42B in the charging circuit 42 based on the capacitor voltage Vc detected by the voltage sensor 45 and the vehicle speed V detected by the vehicle speed sensor 24. The switching elements 42A, 42B are constantly off.

Specifically, the ECU 33 for power source control executes a charging control process similar to the charging control process described using FIG. 3.

In the present embodiment, the motor driving circuit 52 can constantly be supplied with power by the main power supply 31 and the capacitor (auxiliary power supply) 44. Thus, compared to the electric power steering system described in JP 2009-78737 A and switching the power supply state between a state where the motor driving circuit is supplied with power only by the main power supply and a state where the motor driving circuit is supplied with power by the main power supply and the capacitor, the present embodiment eliminates the need for a switching circuit, enabling a reduction in costs.

Compared to the electric power steering system described in JP 2009-78737 A, the present embodiment reduces fluctuations in voltage, allowing a steering feeling to be enhanced. Compared to a case in which the motor driving circuit is supplied with power only by the main power supply in the electric power steering system described in JP 2009-78737 A, the present configuration increases the voltage applied to the motor driving circuit and thus reduces a current supplied to the motor driving circuit if power consumption of the EPS is the same. This enables a reduction in a current drawn from the main power supply 31 and in a power loss through wiring.

In the present embodiment, the motor driving circuit 52 can constantly be supplied with power by the main power supply 31 and the capacitor 44. Consequently, in the situation where stationary steering, which needs a high steering assist force, is enabled (the situation where the vehicle speed is low), the motor driving circuit 52 can be supplied with power by the main power supply 31 and the capacitor 44.

In the above-described embodiment, the auxiliary power supply includes a capacitor. However, the auxiliary power supply may be an all-solid battery, a lithium ion battery, or the like instead of the capacitor.

What is claimed is:

1. An electric power steering system comprising:
   a vehicle speed detector configured to detect a vehicle speed;
   a driving circuit configured to supply power to an electric motor;
   a main power supply configured to supply power to the driving circuit;
   an auxiliary power supply configured to supply power to the driving circuit, the auxiliary power supply being a capacitor;
   a charging circuit configured to charge the auxiliary power supply based on the main power supply;
   a switching circuit configured to switch a power supply state between (i) a first power supply state where the driving circuit is supplied with power only by the main power supply and (ii) a second power supply state where the driving circuit is supplied with power utilizing both the main power supply and the auxiliary power supply;
   a first controller that controls the charging circuit; and
   a second controller that controls the switching circuit, wherein:
   the first controller is configured to drive the charging circuit to charge the auxiliary power supply only when (i) the vehicle speed detected by the vehicle speed detector is lower than a predetermined first threshold, and (ii) an inter-terminal voltage of the auxiliary power supply is lower than a predetermined second threshold; and
   the second controller is configured to set the switching circuit such that:
   when the power supply state is the first power supply state and the vehicle speed detected by the vehicle speed detector is lower than a predetermined third threshold, the power supply state is switched to the second power supply state; and
   when the power supply state is the second power supply state and the vehicle speed detected by the vehicle speed detector is equal to or higher than the predetermined third threshold, the power supply state is switched to the first power supply state after the second power supply state is maintained until the inter-terminal voltage of the auxiliary power supply becomes equal to or lower than a predetermined fourth threshold.

2. The electric power steering system according to claim 1, further comprising:
   a processor programmed to act as both the first controller and the second controller.

\* \* \* \* \*